May 5, 1964
HOP LEE
3,131,590
MUSICAL WHISTLE
Filed April 27, 1962
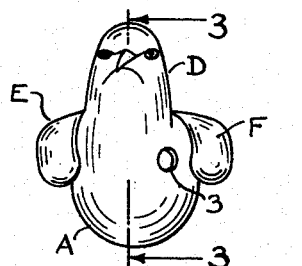
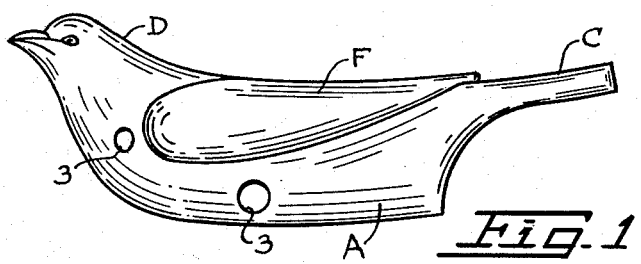
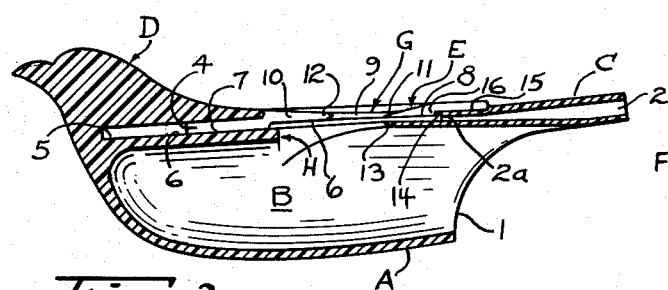
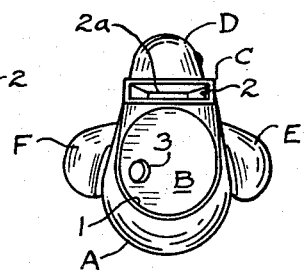
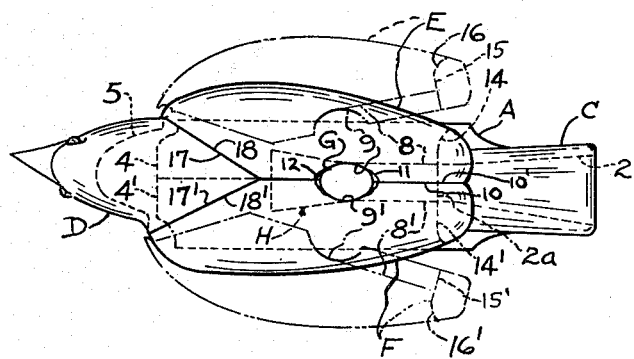
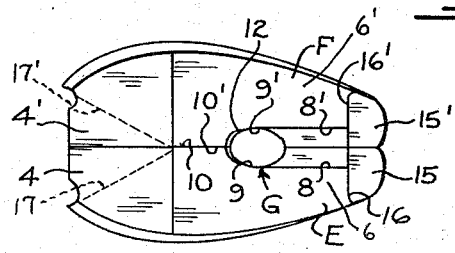
INVENTOR.
HOP LEE
BY
ATTORNEYS

United States Patent Office 3,131,590
Patented May 5, 1964

3,131,590
MUSICAL WHISTLE
Hop Lee, 779 Commercial St., San Francisco 8, Calif.
Filed Apr. 27, 1962, Ser. No. 190,663
4 Claims. (Cl. 84—330)

The present invention relates to improvements in musical whistles and it consists in the combinations, constructions and arrangement of parts hereinafter described and claimed.

An object of my invention is to provide a musical whistle which is in the shape of a bird. When the wings of the bird are in closed position the whistle can be used for making a tone. However, when the bird's wings are spaced apart to simulate that the bird is in flight, the whistle is made non-active and no note or tone can be produced by blowing into the whistle in the usual manner.

A further object of my invention is to provide a device of the type described in which the hollow body of the whistle is made to resemble the body of a bird and the bird's tail functions as the mouth piece for the whistle into which air can be blown for producing a sound. The body of the whistle has one or more openings that can be closed by the fingers. The tone of the whistle can be changed by uncovering one or more of the openings.

The device is simple in construction and it is durable and efficient for the purpose intended.

Other objects and advantages will appear as the specification continues. The novel features of the invention will be set forth in the appended claims.

Drawing

For a better understanding of my invention, reference should be made to the accompanying drawing, forming part of this specification, in which:

FIGURE 1 is a side elevation of the musical whistle;
FIGURE 2 is a front elevation of the device;
FIGURE 3 is a longitudinal section taken along the line 3—3 of FIGURE 2;
FIGURE 4 is a rear elevation of the device;
FIGURE 5 is a top plan view of the device showing the bird's wings closed by full lines and partially opened by dot-dash lines; and
FIGURE 6 is an inner plan view of the two wings shown alone and in closed position and illustrating certain normally hidden features.

While I have shown only the preferred form of my invention, it should be understood that various changes, or modifications, may be made within the scope of the annexed claims without departing from the spirit thereof.

Detailed Description

In carrying out my invention I provide a musical whistle that has a body portion A fashioned in the shape of a bird. The body is hollow for the greater part of its length and it has an air cavity B therein. The cavity B has a rear opening 1 which is clearly shown in FIGURES 3 and 4. The mouth piece C of the whistle is in the shape of a tail for the body of the bird. The mouth piece has an air passage 2 extending therethrough and the shape of the passage is clearly shown in FIGURES 3 and 4. The body A has one or more openings 3 therein that communicate with the body cavity B. The purpose of the openings 3 will be explained hereinafter.

FIGURE 1 shows the body A provided with a bird head D that is disposed at the end of the body opposite to the tail C which constitutes the mouth piece of the musical whistle. FIGURE 5 is a top plan view of the musical whistle and it will be seen that a pair of wings E and F overlie the body A. The construction of each wing is identical to the other except that the parts are reversed. A description of the wing E shown in FIGURE 5 will be given and the numerals will be primed for corresponding parts of the wing F.

The wing E has a tongue portion 4 that is designed to be frictionally received in a groove 5 in the body A. In like manner the wing F has a tongue portion 4' which will be received in the same groove. The wings E and F can be swung from the closed position shown by the full lines in FIGURE 5 into the open position shown by the dot-dash lines in the same figure. The underside 6 of the wing E and the tongue 4 will fit snugly against the top portion 7 of the body A when the wing is in closed position. The underside of the wing E has a groove 8 that extends from a half oval-shaped recess 9 to the air passage 2 in the mouth piece C, see FIGURES 5 and 6. In like manner the wing F has a groove 8' in its underside and this groove connects with the passage 2 and with a half oval-shaped recess 9'. When the two wings E and F are in closed position they will contact with each other along their adjacent edges 10 and 10'. When the wings do contact with each other the two grooves 8 and 8' will cooperate with each other and with the top portion 7 of the body A to form an air passage that is an extension of and will communicate with the passage 2. This extension air passage formed by uniting the grooves 8, 8', leads to the oval opening G formed by the recesses 9 and 9' when the wings E and F are closed. The passage 2, see FIGURES 3, 4 and 5, is larger in width and height at the entrance end than it is at the exist end 2a. The entrance opening is made large enough so that the tongue of the operator can be used at this end to aid in making different types of sounds. The rear portion of the opening G is bevelled on top at 11 to make a sharp edge. The front portion of the same opening is provided with a double bevel at 12 to make a sharp edge. These two sharp edges 11 and 12 cooperate with an opening H in the body A to form a wave pulsation in the air cavity B when the operator blows air into the passage 2. It is this wave pulsation that produces the tone or whistle.

The cavity B acts as a resonance chamber and the air from the passage 2 and the passage extension formed by the grooves 8 and 8' will strike the sharp edges 11 and 12 of the opening G, and the sharp edge 13 of the triangularly-shaped opening H to create air wave pulsations that will have a wave length in direct proportion to the length of the cavity B. A definite tone will therefore be given out by the musical whistle. The pitch of the tone can be altered by the operator using his fingers to close one or more of the openings 3 that communicate with the cavity B. The closing of the openings 3 in effect changes the effective length of the cavity B and alters the wave length produced and therefore a different tone will be sounded. The openings 3 are round but may be square or other shape. They may be placed on one side of the body A or on both sides. The triangular-shaped opening H in the body A shown in FIGURES 3 and 5 has a rounded apex bevelled from the cavity side B so as to provide the sharp adge 13. This edge is positioned adjacent to the sharp edge 11 to cooperate therewith in producing the wave pulsations that give forth the sound.

One of the important features of the invention lies in the fact that when the bird wings E and F are swung into an open position, see the dot-dash lines in FIGURE 5, the device will no longer function as a whistle and no tone or sound can be produced even though air is blown into the passage 2 by the operator. The reason for this is that as soon as the bird wings are moved into an open position, the grooves 8 and 8' in the wings E and F respectively will be moved away from each other and this will eliminate the air passage that extends from the inner end 2a of the passage 2 to the opening G. Therefore a blowing of air into the passage 2 by the operator will merely cause the air to escape into the atmosphere from the inner end 2a. The air cannot flow past the opening G to create wave pulsations in the cavity B and therefore no tone will be given forth. A closing of the wings E and F will again bring the two grooves 8 and 8' together and then the top portion 7 of the body A will complete the formation of the air passage extension for the passage 2.

Both FIGURES 3 and 5 show the top of the tail C projecting above the top portion 7 of the body A and forming a shoulder 14. The wings E and F have recesses 15—15' on their under surfaces, see FIGURE 6, and these are bounded by shoulders 16—16' that are designed to contact with the shoulder 14 on the body A when the wings are swung into closed position. The surfaces of the recesses 15—15' will frictionally contact with the adjacent portions of the top of the tail C, to hold the rear ends of the wings in closed position. The tongues 4 and 4' have their surfaces frictionally contacting the upper and lower walls of the groove 5 for anchoring the front ends of the wings E and F in place. In this way the wings will not become accidentally dislodged.

When the wings are closed the adjacent edges 10—10' of the two wings E and F will contact with each other. In addition the wings have inclined edges 17—17' that extend at an angle to the edges 10—10'. The inclined edges contact similarly inclined edges 18—18' on the top of the body A adjacent to the neck of the bird's head D to aid in positioning the wings properly when in closed position so that sounds or tones will be emitted when air is blown into the passage 2.

I claim:
1. A musical whistle comprising:
   (a) a body in the shape of a bird and having
   (b) a resonant cavity therein
   (c) an opening provided in the top portion of said body and communicating with said cavity.
   (d) a mouthpiece in the shape of a bird's tail with the forward portion thereof being spaced from said opening,
   (e) said mouthpiece having an air passage therein,
   (f) a pair of members shaped like birds' wings pivotally mounted on said body and movable from a closed abutting position to an open position,
   (g) each of said members having a recess formed in common edge thereof and arranged to define with one another when said members are in closed abutting relation an opening registering with the opening in the top portion of said body,
   (h) each of said members when in closed abutting engagement having a portion thereof extending over the forward portion of said mouthpiece,
   (i) each of said members having a groove formed in its upper surface and extending from said recess toward the end of its respective member,
   (j) the grooves in said members cooperating with one another when said members are in abutting engagement to define an extension of said passage to the opening in the top of said body whereby a blowing of air into said mouthpiece will cause the whistle to produce a tone.

2. The combination as set forth in claim 1; and in which
   (a) the said extended air passage formed when said wing-shaped members are in closed position is eliminated when said wing members are moved away from each other; and
   (b) the opening formed by the cooperating recesses when said wing-shaped members are in closed position is eliminated when said members are moved away from each other;
   (c) whereby a whistle tone cannot be produced when air is blown into said mouth piece.

3. The combination as set forth in claim 1: and in which
   (a) additional openings are provided in said body and communicate with said cavity; said openings being closable by the fingers of the operator for changing the tone of the whistle when said wing members are closed.

4. The combination as set forth in claim 1: and in which
   (a) each wing-shaped member has a tongue-shaped projection at the forward end of the member;
   (b) said body having a groove for receiving said tongues with the walls of the groove frictionally contacting with said tongues for holding said wing-members in adjusted position.

References Cited in the file of this patent
UNITED STATES PATENTS

| 396,295 | Schofield | Jan. 15, 1889 |
| 2,679,230 | Ward | May 25, 1954 |

FOREIGN PATENTS

| 917,532 | Germany | Sept. 6, 1954 |